US012775342B2

(12) United States Patent
Smith et al.

(10) Patent No.: US 12,775,342 B2
(45) Date of Patent: Oct. 27, 2026

(54) CONTROL STICK WITH ENABLING AND DISABLING FUNCTIONALITY

(71) Applicant: Universal City Studios LLC, Universal City, CA (US)

(72) Inventors: Kevin Smith, Orlando, FL (US); Ray Ellington Chowning, IV, Orlando, FL (US); Myles Geoffrey McClellan, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 19/088,671

(22) Filed: Mar. 24, 2025

(65) Prior Publication Data

US 2025/0306692 A1 Oct. 2, 2025

Related U.S. Application Data

(60) Provisional application No. 63/570,125, filed on Mar. 26, 2024.

(51) Int. Cl.
*G06F 3/0338* (2013.01)
*G05G 9/047* (2006.01)

(52) U.S. Cl.
CPC ........... *G06F 3/0338* (2013.01); *G05G 9/047* (2013.01)

(58) Field of Classification Search
CPC .............................. G06F 3/0338; G05G 9/047
(Continued)

(56) References Cited

U.S. PATENT DOCUMENTS 6,288,352 B1 * 9/2001 Fukui .................. H01H 13/506 200/16 A
7,623,116 B1 11/2009 Bidiville
(Continued)

FOREIGN PATENT DOCUMENTS

DE 10023199 A1 * 1/2001 ............. B25J 13/06
DE 10023199 B4 9/2009
(Continued)

OTHER PUBLICATIONS

Zeus with buttons, SSP Safety system products, https://www.sspnorth.com/product/zeus-two-button/ , last accessed Jan. 9, 2025, 4 pages.
(Continued)

*Primary Examiner* — Mark Edwards
(74) *Attorney, Agent, or Firm* — Fletcher Yoder, P.C.

(57) ABSTRACT

A control stick includes a handle coupled to a base, the handle pivots relative to the base, and a controller system configured to detect an angle and a direction of the handle relative to a neutral position and provide data to a controlled device based on the angle and the direction, wherein the controller system includes a transmitter. The control stick also includes an interactive element coupled to the handle that includes at least three operational configurations. In a first operational configuration, the interactive element is partially toggled and enables the data to be transmitted via the transmitter. In a second operational configuration, the interactive element is toggled shut and blocks the data from being transmitted from the transmitter or sends a default command. In a third operational configuration, the interactive element is toggled open and blocks the data from being transmitted from the transmitter or sends the default command.

20 Claims, 3 Drawing Sheets

(58) Field of Classification Search
USPC .......................................................... 345/161
See application file for complete search history.

(56) References Cited

U.S. PATENT DOCUMENTS

| | | | |
|---|---|---|---|
| 10,324,540 B1 | 6/2019 | Parazynski | |
| 2006/0097453 A1 | 5/2006 | Feldman et al. | |
| 2017/0246533 A1 | 8/2017 | LaChappelle et al. | |
| 2019/0086895 A1 * | 3/2019 | Preisinger ................ | B25J 13/06 |

FOREIGN PATENT DOCUMENTS

| | | | | |
|---|---|---|---|---|
| EP | 2065782 A2 | * | 6/2009 | ............. G05G 9/047 |
| EP | 3211505 B1 | | 9/2021 | |
| IT | 20100122 A1 | | 9/2011 | |
| JP | 2002334625 A | * | 11/2002 | |
| JP | 2014052885 A | | 3/2014 | |
| JP | 6414628 B2 | | 10/2018 | |
| JP | 2019152974 A | * | 9/2019 | |
| WO | 9609147 A1 | | 3/1996 | |

OTHER PUBLICATIONS

JC50-YO-24R2GP Ct, P3 America, Inc., Precision sensors & Joysticks, https://p3america.com/jc50-yo-24r2gp-ct/ , Last Accessed Jan. 9, 2025, 4 pages.
"Category: Controllers with Pressure-Sensitive Face Buttons," Category: Controllers with Pressure-Sensitive Face Buttons—PCGamingWiki PCGW—Bugs, Fixes, Crashes, Mods, Guides and Improvements for Every PC Game, www.pcgamingwiki.com/wiki/Category: Controllers_with_pressure-sensitive_face_buttons#:~:text=Pressure%2Dsensitive%20face%20buttons%20have,or%20full%20turns%2C%20and%20more, last accessed Jan. 9, 2025.
PCT/US2025/021348 International Search Report and Written Opinion mailed Jul. 3, 2025.

* cited by examiner

CONTROL STICK WITH ENABLING AND DISABLING FUNCTIONALITY

CROSS-REFERENCE TO RELATED APPLICATION

This application claims priority from and the benefit of U.S. Provisional Application Ser. No. 63/570,125, entitled "CONTROL STICK WITH ENABLING AND DISABLING FUNCTIONALITY", filed Mar. 26, 2024, which is hereby incorporated by reference in its entirety.

BACKGROUND

Control sticks (also referred to as joysticks) are often employed to facilitate control of mechanical devices (e.g., heavy machinery, robotic equipment, vehicles, drones). Specifically, control sticks are often employed to allow a user (e.g., driver, operator, pilot) to control operation (e.g., activation, movement) of respective mechanical devices within an environment. Traditionally, control sticks are designed to translate user guidance into operational instructions for a particular mechanical device. Indeed, control sticks are typically designed to receive user guidance that is physically entered via maneuvering of the control stick and translate corresponding physical actuations into instructions for operation of the mechanical device. However, it is now recognized that, in some situations, the physical inputs provided by the user via the control stick may cause operations that are undesirable. For example, in certain situations, a user may unintentionally cause operation that is undesirable (e.g., operations that are damaging to the mechanical device being controlled). Accordingly, it is now recognized that there is a need for control sticks that can be employed to limit such situations.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, a control stick includes a handle coupled to a base, wherein the handle is configured to pivot relative to the base, and a controller system configured to detect an angle and a direction of the handle relative to a neutral position and provide data to a controlled device based on the angle and the direction, wherein the controller system includes a transmitter. The control stick also includes an interactive element coupled to the handle, the interactive element including at least three operational configurations, wherein in a first operational configuration, the interactive element is partially toggled and enables the data to be transmitted via the transmitter, in a second operational configuration, the interactive element is toggled shut and blocks the data from being transmitted from the transmitter or sends a default command via the transmitter, and in a third operational configuration, the interactive element is toggled open and blocks the data from being transmitted from the transmitter or sends the default command via the transmitter.

In an embodiment, a control stick includes a handle coupled to a base, the handle comprising an interactive element configured to transition between a first operational configuration, a second operational configuration, or a third operational configuration, and a sensing system configured to detect and generate an indication of the interactive element being in the first operational configuration, the second operational configuration, and the third operational configuration. The control stick also includes a controller system configured to provide data to a controlled device based on an angle and direction of the handle relative to a neutral position. Further, the controller system includes a processing system and a memory, the memory encoded with instructions configured to be executed by the processing system to cause the controller system to receive the indication of the first operational configuration and transmit the data based on the angle and the direction of the handle relative to the base, and receive an additional indication of the second operational configuration or the third operational configuration and block the data from being transmitted or send a default command.

In an embodiment, a method for operating a controlled device includes sensing, via a processing system including one or more processors, actuation of a control stick and generating guidance instructions based on the actuation, receiving, via the processing system, an indication of an interactive element in a first operational configuration, and transmitting, via the processing system, the guidance instructions to the controlled device to cause movement of the controlled device based on the indication of the interactive element being in the first operational configuration. The method for operating the controlled device also includes receiving, via the processing system, an additional indication of the interactive element in a second operational configuration or a third operational configuration, and blocking, via the processing system, the guidance instructions from being transmitted to the controlled device or sending, via the processing system, additional instructions to shutdown the controlled device based on the additional indication of the interactive element being in the second operational configuration or the third operational configuration.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
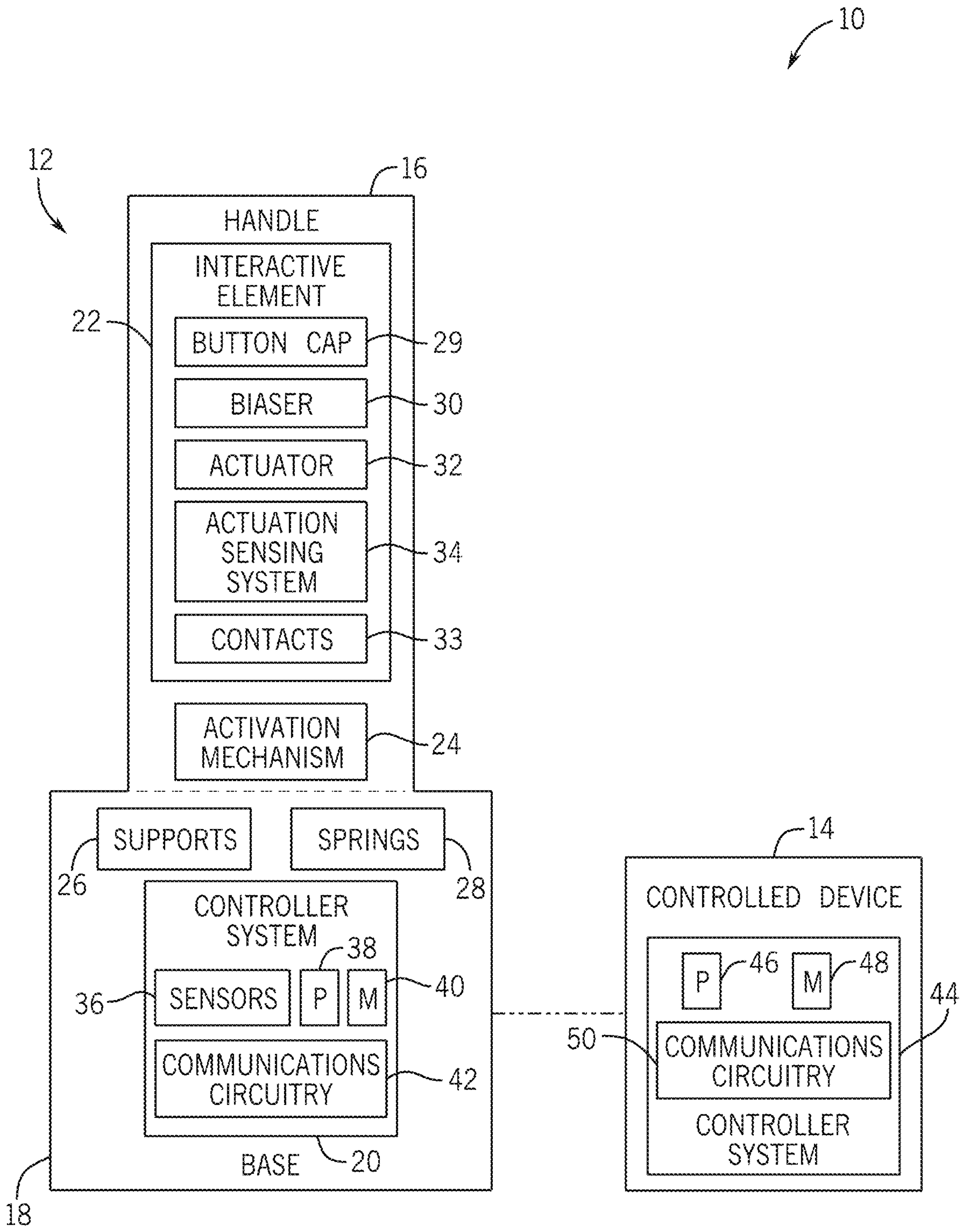
FIG. 1 is a block diagram of a device control system that includes a control stick and a controlled device, in accordance with embodiments of the present disclosure.

The present disclosure generally relates to a control stick, which includes enabling operation and disabling operation functionality.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Control sticks (e.g., joysticks) are often employed to enable a user (e.g., driver, operator, pilot) to control operation (e.g., activation, movement) of respective mechanical devices (e.g., heavy machinery, robotic equipment, vehicles, drones) within an environment. However, in some situations, physical inputs provided by a user via the control stick may cause undesirable operation of the mechanical device. Therefore, it may be desirable to employ a control stick that can limit such situations.

With the foregoing in mind, the systems described herein relate generally to a control stick, which includes enabling and disabling functionality. Specifically, the disclosed control stick may include a base, a handle coupled to the base, and a controller system. The handle may pivot in any suitable direction relative to the base and the controller system may detect an angle and a direction of the handle relative to a neutral position. Further, the control system may provide data to a controlled device (e.g., machine, robot, vehicle, drone) based on the angle and the direction detected. An interactive element may be coupled to the handle. The interactive element (also referred to as an "interactor") may be in a first operational configuration, a second operational configuration, or a third operational configuration.

To be in the first operational configuration, the interactive element may be partially toggled (e.g., partially engaged, partially pressed). For example, a user may partially press a button cap of the interactive element, but without completion of a range of motion involved in a full engagement (e.g., complete press) of the button cap. Thus, the interactive element may maintain contact with an activating mechanism (e.g., one or more switches) after the button cap is partially pressed. The first operational configuration may enable a transmission (e.g., sending) of data from the control stick to the controlled device. For example, the data may include instructions to cause movement of the controlled device.

To be in the second operational configuration, the interactive element may be toggled shut (e.g., fully engaged, fully pressed). For example, the user may fully press the button cap of the interactive element with completion of the range of motion involved in the full engagement of the button cap. In the second operational configuration, the control stick may block (e.g., prevent) the transmission of the data from the control stick or send (e.g., transmit) a default command. Blocking the transmission of the data (or refraining from transmitting the data) from the control stick may result in the controlled device idling or shutting down. For example, by blocking the transmission of the data from the control stick, the controlled device may stop receiving instructions that cause the movement of the controlled device. The disruption in the transmission of the data may lead to immobilization (e.g., a stop in the movement) of the controlled device. Moreover, the default command may include a shutdown command or an idle command sent to the controlled device to cause the immobilization.

To be in the third configuration, the interactive element may be toggled open (e.g., released, fully disengaged). For example, the user may disengage (e.g., remove an extremity) from the button cap and/or the control stick, resulting in the button cap and the interactive element returning to an initial position. The interactive element may be disengaged from the activating mechanism, which may result in the immobilization of the controlled device. The third operational configuration may also cause the control stick to block the transmission of the data from the control stick or send the default command. As such, the systems described herein may limit situations in which a user may unintentionally cause operation of the controlled device that is undesirable (e.g., operations that are damaging to the controlled device). That is, the control stick may limit those situations by disabling the movement of the controlled device when the interactive element is in the second operational configuration or the third operational configuration.

Turning now to the drawings, FIG. 1 depicts a block diagram of a device control system 10 that includes a control stick 12 (e.g., a joy stick) and a controlled device 14, in accordance with embodiments of the present disclosure. The control stick 12 may include a handle 16 coupled to a base 18, a controller system 20 (e.g., a controller), and an interactive element 22. Further, the control stick 12 may include an activation mechanism 24 (e.g., one or more contact switches), one or more supports 26 (e.g., gimbals, pivoted supports, multi-axis supports), and/or one or more springs 28. It should be noted that while the control stick 12 is described as including a stick, the control stick 12 may be any suitable control input device, such as a mouse, a yoke, and so on.

The interactive element 22 may include a button cap 29, a biaser 30 (e.g., a biasing element), an actuator 32, one or more contacts 33, and/or an actuation sensing system 34. The button cap 29 (e.g., button) may include any suitable component that may enable user interaction to initiate a function or perform an action. The button cap 29 may include any suitable switch or button to enable the toggle open functionality, the toggle shut functionality, and the partially toggled functionality. As an example, the user may press on the button cap 29 to enable the partially toggled functionality.

The biaser 30 may enable the interactive element 22 and/or the button cap 29 to bias (e.g., move) toward an initial position (e.g., a position where no force is applied, a starting position, a third operational configuration). As an example, the biaser 30 may include any suitable spring, which may push the interactive element 22 and/or the button cap 29 toward being toggled open. The actuator 32 may include any suitable mechanical or electronic device that enables movement and control of the interactive element 22. The actuator 32 may convert one form of energy into mechanical motion to enable the interactive element 22 to move to toggle open, toggle shut, or partially toggled.

The one or more contacts 33 may include one or more points within the interactive element 22 where an electrical connection may be made or broken. The one or more contacts 33 may include moving contacts, which may be moved within the interactive element 22 to make a connection with the activation mechanism 24. For example, the one or more contacts 33 may connect with the activation mechanism 24 to establish a flow of electric current within an electric circuit. The flow of electric current within the electric circuit may enable data transmission (e.g., sending signals) and facilitation of communication between the control stick 12 and the controlled device 14.

In an embodiment, the actuation sensing system 34 may detect a first operational configuration (e.g., partially toggled), a second operational configuration (e.g., toggled shut), and the third operational configuration (e.g., toggled open) based on the position of the actuator 32.

In an embodiment, the actuation sensing system 34 may send an indication of the first operational configuration, the second operational configuration, and the third operational configuration to the controller system 20. For example, the actuation sensing system 34 may include various sensors to monitor the position of the actuator 32, the movement of the actuator 32, the force on the actuator 32, the contacts 33 (e.g., whether the contacts 33 are connected to the activation mechanism 24), and so on. The actuation sensing system 34 may then transmit data to the controller system 20 based on the first operational configuration, the second operational configuration, or the third operational configuration. For example, if the interactive element 22 is in the first operational configuration, the actuation sensing system 34 may detect the first operational configuration and transmit an indication to the controller system 20 based on the detection. Additional detail regarding the interactive element 22, the first operational configuration, the second operational configuration, and the third operational configuration will be described below with respect to FIGS. 2-5.

The activation mechanism 24 may include one or more terminals. The one or more terminals may include one or more contact terminals (e.g., a specific point where an electrical component is connected). For example, the one or more contact terminals may include a pin contact or any other suitable electrical connector. The one or more terminals may establish a connection between the activation mechanism 24 and the one or more contacts 33.

In an embodiment, the one or more terminals may be a part of one or more switches. For example, the one or more switches may include a contact switch that may be activated when two conductive materials come into contact (e.g., the one or more contacts 33 and the activation mechanism 24). That is, when the contact switch is pressed or a physical force is applied to contact an additional contact (e.g., the one or more contacts 33), the electrical circuit may be completed. The completion of the electrical circuit may signal a presence of the contact. Thus, when the interactive element 22 is partially toggled (e.g., partially pushed, partially pressed), it may come in contact with the activation mechanism 24, completing the electrical circuit and initiating generation of instructions for movement (based on an angle and/or a direction of the handle 16).

The supports 26 may enable the handle 16 to pivot relative to the base 18 in any suitable angle and/or direction (e.g., a 360-degree rotation). For example, the supports 26 may include multiple pivot points around which the handle 16 may move. The pivot points may provide stability while enabling the handle 16 to pivot around the base 18. In an embodiment, the supports 26 may include bearings to reduce friction and enable smooth movement.

The springs 28 may provide resistance during manipulation of the handle 16. The springs 28 may include a centering spring and/or a tension spring. The centering spring may provide resistance against movement and/or return the handle 16 to a neutral position (e.g., center position) to ensure the handle 16 does not remain tilted or moved after release. The tension spring may provide resistance against the movement of the handle 16 in different directions to control the force involved in moving the handle 16. In an embodiment, the springs 28 may be adjustable, which may enable the user to customize the resistance according to preferences. In another embodiment, multiple springs 28 may be combined to provide differing tension levels in the different directions. For example, the handle 16 may have a light resistance along a vertical axis and a strong resistance along a horizontal axis. The springs 28 may include any suitable biasing device that may provide resistance, such as springs, dampers, or bands.

The controller system 20 may include one or more sensors 36, one or more processors 38 (referred to herein as a single processor for convenience), a memory 40, and/or communications circuitry 42. The one or more sensors 36 may include any number of resistance sensors (e.g., potentiometers), Hall effect sensors, acceleration sensors, force sensors, contact sensors, motion sensors, or any other suitable sensor. The resistance sensor may measure an angular position of the control stick 12. The Hall effect sensor may detect a magnetic field generated by a magnet attached to any suitable moving part of the control stick 12 to obtain positional data. The acceleration sensor may measure an acceleration force, such as when the handle 16 is tilted or shaken. The force sensor may detect the amount of force that is applied to the handle 16 and/or the interactive element 22 of the control stick 12. The contact sensor may detect physical contact or touch with an object or surface. The motion sensor may detect motion and a direction in which the handle 16 is moving.

The processor 38 may include any type of computer processor or microprocessor capable of executing computer-executable code. The processor 38 may also include multiple processors, processing circuitry, or a processing system that may perform the operations described herein. For example, the processor 38 may receive sensor data from the one or more sensors 36 and generate an output signal to the controlled device 14.

The memory 40 may include a volatile memory, such as random access memory (RAM), and/or a nonvolatile memory, such as read-only memory (ROM). The memory 40 may store a variety of information and may be used for various purposes. For example, the memory 40 may store processor-executable instructions, such as instructions for controlling components of the control stick 12. The memory 40 may also include flash memory, or any suitable optical, magnetic, or solid-state storage medium, or a combination thereof. The memory 40 may store data, instructions (e.g., software or firmware for controlling enablement and disablement of the controlled device 14), and any other suitable information.

The communications circuitry 42 may be a wireless communication component that may facilitate communication between the control stick 12, the controlled device 14, and/or various other computing systems via a network. The communications circuitry 42 may include antennas, transceiver (e.g., transmitter and receiver) circuits, and signal processing hardware and/or software (e.g., hardware or software filters, Analog-to-Digital (ADC) converters, multiplexers amplifiers), or a combination thereof, and the communications circuitry 42 may be configured to communicate over wireless communication paths via Infrared (IR) wireless communication, satellite communication, broadcast radio, Microwave radio, Bluetooth, Zigbee, Wi-fi, UHF, NFC, etc. For example, the user may provide an input via the control stick 12 to instruct movement of the controlled device 14, and the input may be communicated wirelessly from the control stick 12 to the controlled device 14 via the network. In an embodiment, the control stick 12 and the controlled device 14 may be communicatively coupled via wired communication channels.

The controlled device 14 may include a controller system 44, which may include one or more processors 46 (referred to herein as a single processor for convenience), a memory 48, and/or communications circuitry 50. The processor 46 may be similar to and/or the same as the processor 38. The memory 48 may be similar to and/or the same as the memory 40. The communications circuitry 50 may be similar and/or the same as the communications circuitry 42.

In an embodiment, the one or more sensors 36 and/or the actuation sensing system 34 may directly control the controlled device 14. For example, after detecting a change, the one or more sensors 36 and/or the actuation sensing system 34 may produce an electrical signal proportional to a measured quantity. An ADC may convert the electrical signals into digital data for processing and interfacing (e.g., via the communications circuitry 42) with the controlled device 14. The controlled device 14 may receive the digital data via the communications circuitry 50, process the digital data, and determine a corresponding action. As an example, the controlled device 14 may activate or deactivate a motor, an actuator, or any other suitable component to control movement or disable the movement of the controlled device 14.

Figure 2:
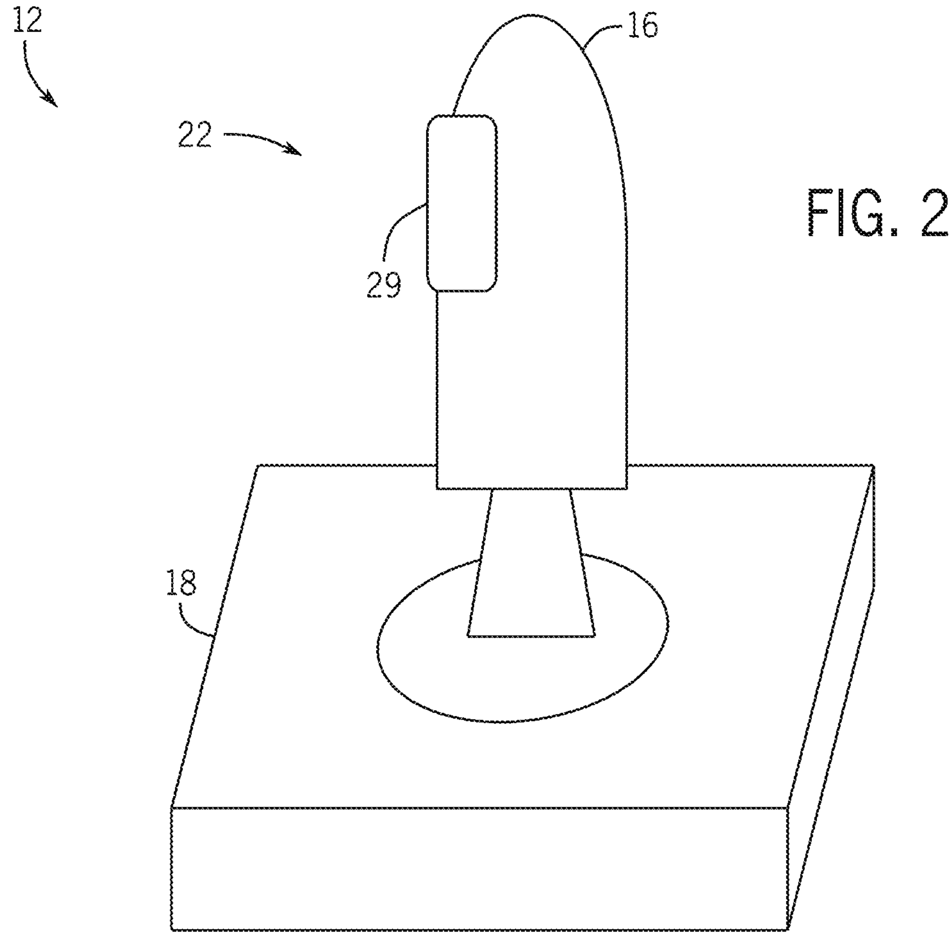
FIG. 2 is a perspective view of an embodiment of the control stick of FIG. 1, in accordance with embodiments of the present disclosure.

With the foregoing in mind, FIG. 2 is a perspective view of an embodiment of the control stick 12 of FIG. 1, in accordance with embodiments of the present disclosure. As described herein, the control stick 12 may include the handle 16, the base 18, and the interactive element 22. As described herein, the interactive element 22 may include the button cap 29, which may include any suitable switch or button to enable the toggle open functionality, the toggle shut functionality, and the partially toggled functionality. Each of the toggle open functionality, the toggle shut functionality, and the partially toggled functionality may operate within a respective range of operation. As an example, the button cap 29 may include a toggle switch, a slide switch, a momentary switch, a push button, and the like. While only the interactive element 22 with the button cap 29 is illustrated, it should be understood that present embodiments may include any number of interactive elements (e.g., buttons, switches, contacts) and any number of button caps.

When the interactive element 22 is partially toggled, the interactive element 22 may be in the first operational configuration. While partially toggled, the button cap 29 is neither fully released (e.g., in a default or initial position) nor fully pushed (e.g., fully engaged or pushed to an end). Instead, the button cap 29 is in an intermediate position (e.g., a mid-range position) or has an intermediate amount of force being applied to it. Indeed, the user may apply a first force (e.g., a lesser force) to the button cap 29 to partially toggle the interactive element 22. As an example, the user may partially squeeze (e.g., in a light or controlled grip) the button cap 29 with the first force. As another example, in an embodiment, the first force (e.g., as measured by a force sensor) may be measured against a force threshold (e.g., a pre-defined threshold) to determine whether the first force is within the force threshold (e.g., an appropriate amount of force is being applied). It should be noted that the force threshold may include any suitable force value in between a range that may include any force value except a zero-force value and a maximum force value. As another example, in an embodiment, the interactive element 22 being partially toggled may be based on a location of the button cap 29 within a location threshold. The location threshold may include any suitable position of the interactive element 22 in between a range that may include any position except when the interactive element 22 is fully open and unactuated or fully closed and fully actuated.

The button cap 29 of the interactive element 22 may include various mid-range positions between the fully released and the fully pushed down position. In each of the mid-range positions, the button cap 29 may cause the one or more contacts 33 to contact the activation mechanism 24 of FIG. 1. Thus, the first operational configuration may enable data to be transmitted from the control stick 12 (e.g., via a transmitter of the communications circuitry 42 of the controller system 20) to the controlled device 14 of FIG. 1. For example, the one or more sensors 36 of the controller system 20 of FIG. 1 may detect an angle and a direction of the handle 16 relative to a neutral position. The controller system 20 may then provide the data based on the angle and the direction to the controller system 44 of FIG. 1 to enable movement of the controlled device 14.

Alternatively, when the interactive element 22 is toggled shut, the interactive element 22 may be in the second operational configuration. While toggled shut, the button cap 29 may be fully pushed down. Indeed, the user may apply a second force (e.g., a bigger force, bigger than the first force) to the button cap 29 to toggle shut the interactive element 22. For example, the user may squeeze the button cap 29 tightly (e.g., squeezing as hard as they can) to trigger the interactive element 22 to be toggled shut. The second force may cause the contact between the one or more contacts 33 and the activation mechanism 24 to break (e.g., cease). Thus, the second operational configuration may cause the controller system 20 to block data transmission from the control stick 12 to the controlled device 14 or send a default command (e.g., via the transmitter of the communications circuitry 42). Further, the default command may include a command to stop motion command, such as a shutdown command (e.g., a zero-speed command) or an idle command (e.g., stop active operation command, a rest state command). This operation may be beneficial because it may prevent undesired operations that may occur when a user is not fully controlling their grip (e.g., a tight grip initiated in response to pain).

Moreover, when the interactive element 22 is toggled open, the interactive element 22 is in the third operational configuration. While toggled open, the button cap 29 is fully released. Indeed, the user may not apply force (e.g., zero force) to the button cap 29 to toggle open the interactive element 22. In an embodiment, the interactive element 22 may act the same as or similar to a kill switch. That is, the moment the button cap 29, and thus, the interactive element 22 is released, the electrical circuit is broken, which may disrupt an electrical connection. For example, the electrical connection may include a connection to a power supply thus causing the blockage of the transmission of data by the controller system 20. As another example, the disruption of the electrical connection may be detected by the one or more sensors 36 and/or the actuation sensing system 34. The one or more sensors 36, the actuation sensing system 34, and/or the controller system 20 may generate a signaling mechanism, which in turn may be transmitted to the controlled device 14 to disable the controlled device 14. This operation may be beneficial because it may prevent undesired operations that may occur when a user is not fully controlling the control stick 12 (e.g., due to loss of contact with the handle 16).

As an example, the user may release (e.g., remove their extremity from) the button cap 29 or the handle 16. The full release of the button cap 29 of the interactive element 22 may cause the one or more contacts 33 to separate from the activation mechanism 24. Therefore, the third operational configuration may cause the controller system 20 to block the data transmission from the control stick 12 to the controlled device 14 or send the default command. Additional detail regarding how the interactive element 22 may be toggled open, toggled shut, or partially toggled will be described below with respect to FIGS. 3-5.

Figure 3:
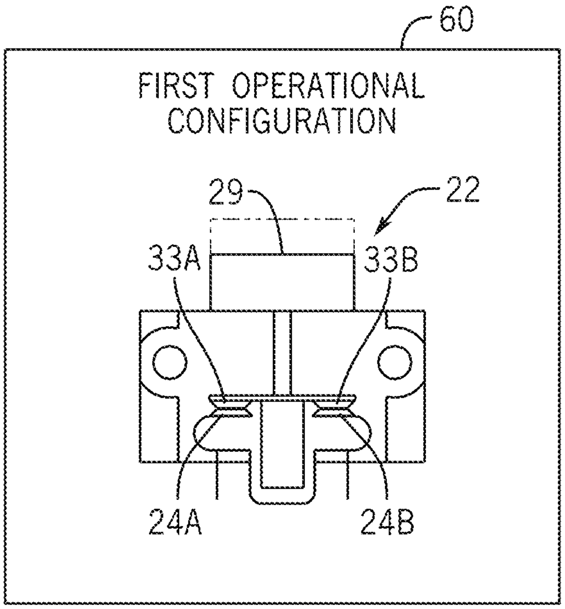
FIG. 3 is a schematic diagram of an interactive element of FIG. 1 in a first operational configuration, in accordance with embodiments of the present disclosure.

FIG. 3 is a schematic diagram of the interactive element 22 of FIG. 1 in a first operational configuration 60, in accordance with embodiments of the present disclosure. As described herein, the interactive element 22 may include the button cap 29 and the one or more contacts 33 of FIG. 1. Additionally, the handle 16 may include the activation mechanism 24 of FIG. 1. When the interactive element 22 is partially toggled (e.g., the button cap 29 is partially pressed), the interactive element 22 is in the first operational configuration 60.

As illustrated in FIG. 3, when the one or more contacts 33 (e.g., a first contact 33A and the second contact 33B) are in contact (e.g., meeting) with the activation mechanism 24 (e.g., a first activation mechanism 24A and a second activation mechanism 24B), the interactive element 22 is partially toggled. That is, the first contact 33A may be in contact with the first activation mechanism 24A (e.g., at a first end of a terminal) and the second contact 33B may be in contact with the second activation mechanism 24B (e.g., at a second end of the terminal opposite the first end). As such, the interactive element 22 may be partially toggled and in the first operational configuration 60, enabling transmission of the data from the control stick 12 to the controlled device 14. For example, the data may be based on an angle and a direction that the handle 16 is positioned in (e.g., based on user manipulation) relative to the neutral position.

Figure 4:
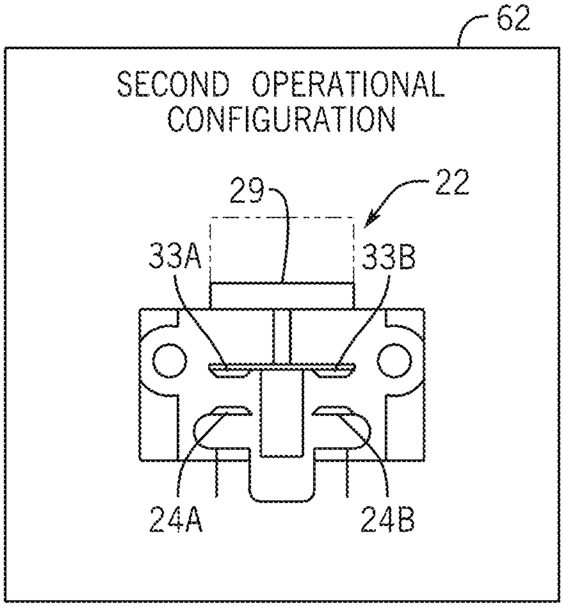
FIG. 4 is a schematic diagram of the interactive element of FIG. 1 in a second operational configuration, in accordance with embodiments of the present disclosure.

FIG. 4 is a schematic diagram of the interactive element 22 of FIG. 1 in a second operational configuration 62, in accordance with embodiments of the present disclosure. As described herein, when the interactive element 22 is toggled shut (e.g., the button cap 29 is fully pressed down), the interactive element 22 is in the second operational configuration 62.

As illustrated in FIG. 4, when the first contact 33A and the second contact 33B are no longer in contact with the first activation mechanism 24A and the second activation mechanism 24B because of the second force applied to the interactive element 22, the interactive element 22 is toggled shut. That is, the first contact 33A may have been in contact with the first activation mechanism 24A and the second contact 33B may have been in contact with the second activation mechanism 24B, but after an application of the second force by the user to the button cap 29, the contact was broken. Thus, the interactive element 22 may be toggled shut and in the second operational configuration 62, and the control stick 12 of FIG. 1 may block the transmission of the data from the control stick 12 to the controlled device 14 of FIG. 1 or send the default command to cause the controlled device 14 to idle or to shutdown.

Figure 5:
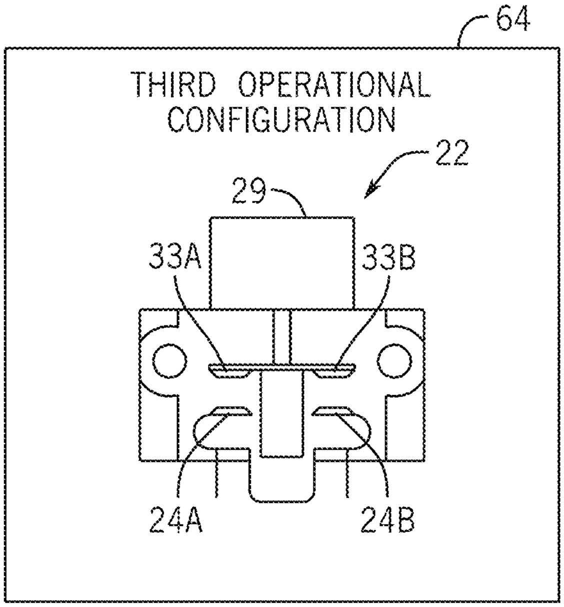
FIG. 5 is a schematic diagram of the interactive element of FIG. 1 in a third operational configuration, in accordance with embodiments of the present disclosure.

FIG. 5 is a schematic diagram of the interactive element 22 of FIG. 1 in a third operational configuration 64, in accordance with embodiments of the present disclosure. As described herein, when the interactive element 22 is toggled open (e.g., the button cap 29 and/or the handle 16 are fully released), the interactive element 22 is in the third operational configuration 64.

As illustrated in FIG. 5, when the first contact 33A and the second contact 33B are no longer in contact with the first activation mechanism 24A and the second activation mechanism 24B because no force is being applied to the interactive element 22, the interactive element 22 is toggled open. The first contact 33A may have been in contact with the first activation mechanism 24A and the second contact 33B may have been in contact with the second activation mechanism 24B, but after the release of the button cap 29 or the handle 16 by the user, the contact was broken. Alternatively, the first force or the second force may have not been applied, and the interactive element 22 is in the initial position or default position and operating in the third operational configuration 64. Accordingly, in the third operational configuration 64, the interactive element 22 is toggled open and the control stick 12 of FIG. 1 may block the transmission of the data from the control stick 12 to the controlled device 14 of FIG. 1 or send the default command to cause the controlled device 14 to idle or to shutdown.

As such, the embodiments described herein enable employment of the control stick 12 that may limit undesirable operation of mechanical devices. For example, by only enabling operation and movement of the mechanical device (e.g., the controlled device 14) while the interactive element 22 is partially toggled. In this manner, the mechanical device may be disabled or commanded to stop motion when the interactive element 22 is toggled shut (e.g., the button cap 29 is pressed with enough force to break the contact) or toggled open (e.g., the button cap 29 and/or the handle 16 released). Accordingly, the control stick 12 may limit unintentional and undesirable operation of the mechanical device that may result in damage to the mechanical device.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A control stick, comprising:

a handle coupled to a base, wherein the handle is configured to pivot relative to the base;

a controller system configured to detect an angle and a direction of the handle relative to a neutral position and provide data to a controlled device based on the angle and the direction, wherein the controller system comprises a transmitter; and an interactive element coupled to the handle, the interactive element including at least three operational configurations, wherein:

in a first operational configuration, the interactive element is partially toggled such that an electrical circuit is complete and enables the data to be transmitted via the transmitter;

in a second operational configuration, the interactive element is toggled shut such that the electrical circuit is broken to disrupt an electrical connection, causing blockage of transmission of the data from the transmitter; and in a third operational configuration, the interactive element is toggled open such that the electrical circuit is broken to disrupt the electrical connection, causing blockage of transmission of the data from the transmitter.

2. The control stick of claim 1, wherein the controller system comprises one or more sensors configured to detect the angle and the direction of the handle relative to the neutral position.

3. The control stick of claim 2, wherein the controller system is configured to generate instructions as the data based on the angle and the direction.

4. The control stick of claim 2, wherein the one or more sensors generate measurements of the angle and the direction as the data.

5. The control stick of claim 1, wherein the interactive element is configured to be partially toggled when a contact of the interactive element is contacting a pair of terminals of an activation mechanism of the handle.

6. The control stick of claim 1, wherein the interactive element is configured to be toggled shut when a contact of the interactive element is disengaged from a first end of a terminal of an activation mechanism of the handle and a second end of the terminal opposite the first end.

7. The control stick of claim 1, wherein the interactive element is biased toward the third operational configuration via a biasing element.

8. The control stick of claim 7, wherein the interactive element comprises a button and the biasing element comprises a spring configured to push the button toward being toggled open.

9. The control stick of claim 1, wherein the controller system comprises one or more sensors including a force sensor, a resistance sensor, a Hall effect sensor, an acceleration sensor, a motion sensor, a contact sensor, or any combination thereof.

10. The control stick of claim 1, wherein the interactive element comprises an actuator and an actuation sensing system configured to detect the first operational configuration, the second operational configuration, and the third operational configuration based on positioning of the actuator.

11. The control stick of claim 1, comprising a spring, wherein the spring is configured to adjust the handle to the neutral position when the interactive element is in the third operational configuration.

12. The control stick of claim 1, comprising supports, wherein the supports are configured to enable movement in one or more directions and at one or more angles.

13. The control stick of claim 12, wherein the supports comprise pivot points, bearings, or both.

14. A control stick, comprising:

a handle coupled to a base, the handle comprising an interactive element configured to transition between at least a first operational configuration, a second operational configuration, and a third operational configuration, wherein the interactive element is partially toggled such that an electrical circuit is complete in the first operational configuration, toggled shut such that the electrical circuit is broken to disrupt an electrical connection in the second operational configuration, or toggled open such that the electrical circuit is broken to disrupt the electrical connection in the third operational configuration;

a sensing system configured to detect and generate an indication of whether the interactive element is in the first operational configuration, the second operational configuration, or the third operational configuration; and a controller system configured to provide data to a controlled device based on an angle and direction of the handle relative to a neutral position, wherein the controller system comprises a processing system and a memory, the memory encoded with instructions configured to be executed by the processing system to cause the controller system to:

receive the indication of the first operational configuration and transmit the data based on the angle and the direction of the handle relative to the neutral position; and receive an additional indication of the second operational configuration or the third operational configuration and block the data from being transmitted based on the disruption of the electrical connection.

15. The control stick of claim 14, wherein the sensing system is configured to detect the first operational configuration, the second operational configuration, and the third operational configuration, based on a position of an actuator.

16. A method for operating a controlled device, the method comprising:

sensing, via one or more sensors, actuation of a control stick;

generating, via a controller system, guidance instructions based on the actuation;

receiving, via the controller system, an indication of an interactive element in a first operational configuration, wherein the interactive element is partially toggled such that an electrical circuit is complete in the first operational configuration;

transmitting, via the controller system, the guidance instructions to the controlled device to cause movement of the controlled device based on the indication of the interactive element being in the first operational configuration;

receiving, via the controller system, an additional indication of the interactive element in a second operational configuration or a third operational configuration, wherein the interactive element is toggled shut in the second operational configuration or toggled open in the third operational configuration such that the electrical circuit is broken to disrupt an electrical connection; and blocking, via the controller system, the guidance instructions from being transmitted to the controlled device based on the additional indication of the interactive element being in the second operational configuration or the third operational configuration, wherein the disruption of the electrical connection causes the blockage of the transmission of the guidance instructions.

17. The method of claim 16, comprising receiving, via the controller system, the indication or the additional indication from the one or more sensors, wherein the one or more sensors are configured to detect the first operational configuration, the second operational configuration, and the third operational configuration.

18. The control stick of claim 1, wherein the controlled device is configured to idle or shutdown without receiving the data.

19. The control stick of claim 18, wherein the interactive element comprises a plurality of contacts comprising a conductive material, and wherein the first operational configuration includes the plurality of contacts engaged with a plurality of activation mechanisms of the interactive element to complete the electrical circuit.

20. The control stick of claim 1, wherein the electrical connection comprises a connection to a power supply, and wherein disrupting the electrical connection causes blockage of transmission of the data based on disrupting the connection to the power supply.

* * * * *